United States Patent [19]

Hayashi

[11] Patent Number: 4,984,350
[45] Date of Patent: Jan. 15, 1991

[54] PROCESS OF INSTALLING A RESONATOR FOR AN AUTOMOBILE

[75] Inventor: Toshihiko Hayashi, Kanagawa, Japan

[73] Assignee: Nissan Motor Company, Limited, Japan

[21] Appl. No.: 374,838

[22] Filed: Jul. 3, 1989

[30] Foreign Application Priority Data

Jul. 4, 1988 [JP] Japan .................................. 63-165130

[51] Int. Cl.⁵ .............................................. B23P 11/02
[52] U.S. Cl. ..................................... 29/525.1; 29/428; 180/68.3
[58] Field of Search ................. 29/428, 525.1, 469; 180/68.3

[56] References Cited

U.S. PATENT DOCUMENTS

| 4,354,566 | 10/1982 | Yuda ................................. | 29/525.1 |
| 4,633,564 | 1/1987 | Saiber ............................... | 29/525.1 |
| 4,765,633 | 8/1988 | Hossack .......................... | 29/525.1 |
| 4,829,646 | 5/1989 | Ciogolotti et al. ............ | 29/525.1 |
| 4,850,771 | 7/1989 | Hurd ................................ | 29/525.1 |

Primary Examiner—Howard N. Goldberg
Assistant Examiner—I. Cuda
Attorney, Agent, or Firm—Leydig, Voit & Mayer

[57] ABSTRACT

A resonator for reducing air intake noise levels occurring in air intake systems of automotive vehicles and an easy installation method therefor are provided. This resonator includes a first tube and a second tube shorter than the first tube to reduce noise at different frequency bands, each extending laterally into a bumper from an air intake duct of an air cleaner. For installation of the resonator, one of a pair of bumper stays is mounted at the front of one of a pair of side members of a vehicular frame. Then, the first tube is attached to said first bumper stay and the second tube is attached to a bracket provided on a radiator core supporting member within the engine compartment. Subsequently, a second bumper stay already installed on a bumper reinforcement member is mounted to the other front side member so as to dispose said first and second tubes within the bumper reinforcement. Finally, the bumper reinforcement is installed to the first bumper stay to be secured to the front of the vehicle frame.

8 Claims, 5 Drawing Sheets

PROCESS OF INSTALLING A RESONATOR FOR AN AUTOMOBILE

BACKGROUND OF THE INVENTION

1. Technical Field

The present invention relates generally to a resonator for reducing the air intake noise of an internal combustion engine. More specifically, the invention relates to a process of easy installation of a resonator within an engine compartment of a vehichle and a resonator, mounted thereby, for reducing air intake noise efficiently.

2. Background Art

Recently, due to tight limits on noise emission related to automotive vehicles and noise reduction within a vehicular cabin desired by users, reduction of engine air intake noise tends to be necessary. The use of resonators for absorbing vibration, especially low frequency vibration, which occurs in air intake systems has been proposed.

For installation of such a resonator within an engine comopartment of a vehicle, resonators have previously been disposed within the bumper reinforcement of the vehicle, mounted on a pair of members at the front of the vehicle frame. Subsequently, the resonator is connected to the intake air duct.

However, conventional installation of such a resonator requires considerable work to connect the resonator and the intake air duct after the installation of the bumper reinforcement to the front side members. The bumper reinforcement and other assembly parts, for example, headlamps, interfere with the efficiency of resonator installation. Additionally, there are some cases where in view of the connecting operations for the resonator and assembly operations for the bumper reinforcement, either the accuracy of the connection or the assembly must be sacrificed.

SUMMARY OF THE INVENTION

It is accordingly an object of the present invention to provide a process for the easy installation of a resonator in a vehicle, which improves the installation and assembly operations necessary for both resonator and bumper reinforcement and the accuracy of installation or assembly thereof and a resonator, mounted thereby, for reducing intake air noise efficiently.

According to one aspect of the present invention, there is provided a process for installing a resonator, connected to an air intake system within an engine compartment of a vehicle, for reducing intake air noise levels, which comprises the steps of mounting a first mounting member on a side member of a vehicle frame, attaching the resonator to the first mounting member to form a first pre-assembly, installing a second mounting member on a bumper to form a second pre-assembly, and securing the second mounting member to the other side member and the first mounting member to the bumper to mount the second pre-assembly to the first pre-assembly so as to dispose the resonator within the bumper.

According to another aspect of the invention, there is provided a process for installing a resonator including a first tube and a second tube shorter than the first tube, connected to an intake air duct within an engine compartment of a vehicle, for reducing air intake noise levels, which comprises the steps of mounting a first bumper stay on a front portion of one side member of a pair of side members of a vehicle frame, attaching the first tube to the first bumper stay and the second tube to a supporting member provided on a radiator supporting member within an engine compartment, mounting a second bumper stay already installed on a bumper reinforcement member to a front portion of the other side member so as to dispose the first and second tubes within the bumper reinforcement member, and installing the bumper reinforcement to the first bumper stay to be secured with respect to the side members.

According to a further aspect of the invention, there is provided an apparatus for reducing air intake noise occurring in an air intake system of an automotive vehicle, which comprises a first tube type resonator for reducing noise of a first frequency, the first resonator extending from the air intake system so as to be disposed within a bumper of an automotive vehicle, and a second tube type resonator having a different size from the first resonator to reduce noise of a second frequency higher than the first frequency, the second resonator extending from the air intake system so as to be disposed within the bumper.

According to a still further aspect of the invention, there is provided resonator mounting structure for an automotive vehicle which comprises a first side member of a vehicle frame, a first bumper stay, attached to the first side member, for supporting a bumper of the automotive vehicle, a second side member of the vehicle frame, a second bumper stay, attached to the second side member, for supporting the bumper, and a tube type resonator extending from an intake air duct of an air cleaner within an engine compartment, the resonator being supported by the first bumper stay to be disposed within the bumper.

BRIED DESCRIPTION OF THE DRAWINGS

DESCRIPTION OF THE PREFERRED EMBODIMENT

Figure 1:
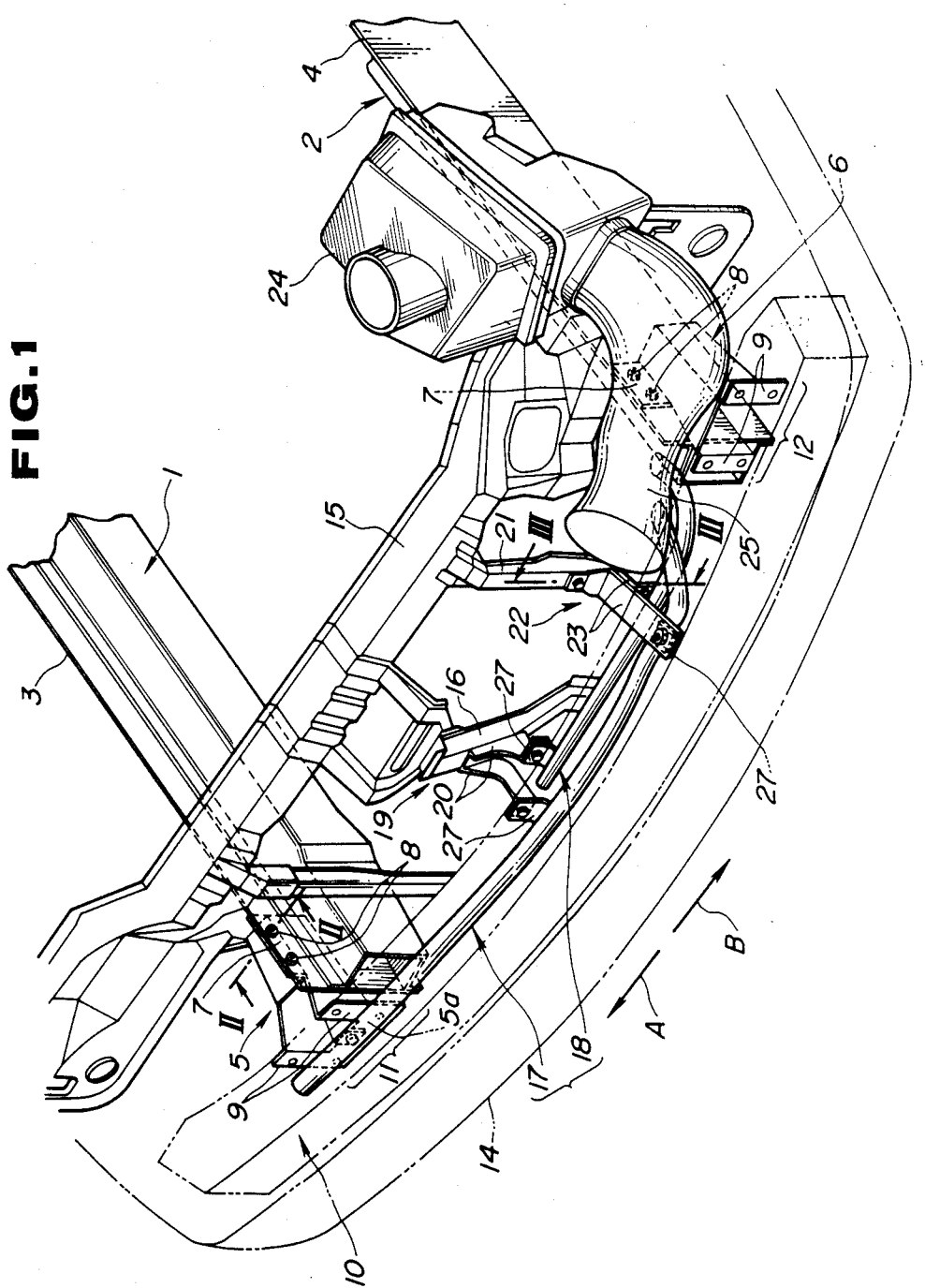
FIG. 1 is a perspective view which shows installation of a resonator according to the invention within an engine compartment.
Figure 2:
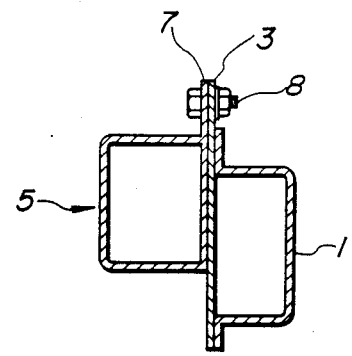
FIG. 2 is a cross sectional view taken along the line II—II in FIG. 1.
Figure 3:
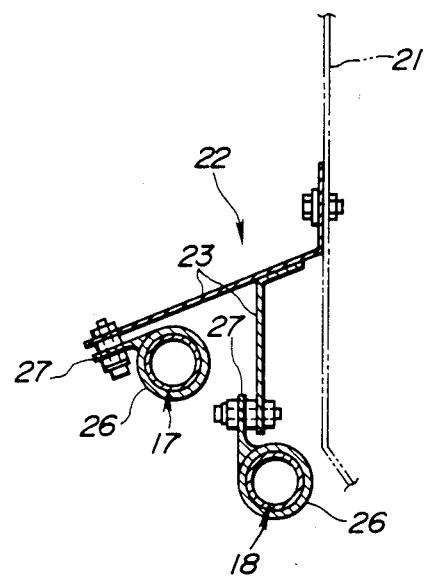
FIG. 3 is a cross sectional view taken along the line III—III in FIG. 1.

Referring now to the drawings, particularly to FIGS. 1, 2 and 3, a pair of resonators for a vehicle according to the invention is shown which is disposed within an engine compartment. These resonators are adapted for resonating at the frequency of air intake noise to reduce its audibility.

A pair of substantially C-shaped front members 1 and 2 which are parts of a vehicular frame are arranged along the longitudinal axis of the vehicle. These C-shaped members are reinformed by closing plates 3 and 4 respectively to improve their mechanical strength. Secured on the front end sections of the closing plates are bumper stays 5 and 6 for supporting a bumper 14. Each bumper stay has a substantially rectangular-shape and incorporates a flange 7 attached to the closing plates by means of bolts 8 (See FIG. 2). The flange 7 has a circular hole 7a and an elliptical hole, corresponding to boltholes (not shown) formed in the closing plates of the front side members, for fixing the bumper stay thereto by the bolts 8 (See FIGS. 6 and 7). The bumper stays 5 and 6 each have a further pair of flanges 9, for supporting a bumper reinforcement member 10 at the front, which are folded in the lateral direction.

The bumper reinforcement 10 is substantially C-shaped in cross section and has two mounting portions 11 and 12 provided on its flanges 13 extending so as to face each other. In the mounting portions, boltholes corresponding to those of the bumper stays 5 and 6 are provided. The bumper reinforcement 10 is installed to the front members 3 and 4 through the bumper stays 5 and 6 at the mounting portions 11 and 12 to increase the mechanical strength of the bumper 14. A method for installation of the reinforcement to the bumper stays and their arrangement will be described in detail hereinafter.

A radiator core supporting panel 15 is provided across the front side members 3 and 4. On the center portion of the panel 15, a hood lock stay 16 is integrally formed so as to extend downward. This hood lock stay 16 includes a first bracket 19 for supporting resonators 17 and 18 to be described hereinafter. The first bracket 19 has a pair of mounting plates 20 for supporting the resonators 17 and 18, which extend parallel to each other with different lengths, to arrange the resonators so as to be spaced from each other by a given distance. Installed on the left side (hereinafter, according to FIG. 1 the side indicated by arrow A will be referred to as the right side, while the other side, indicated by arrow B, will be referred to as the left side) of the radiator core supporting panel 15 is a headlamp stay 21 integrally formed so as to extend downward. A second bracket 22 for supporting the resonators 17 and 18 is suspended on the headlamp stay 21. This second bracket 22 has a pair of bifurcated mounting plates 23, for supporting the resonators, one of which extends downward and the other of which extends laterally so as to slightly incline downward as shown in FIG. 3.

At the left side within the engine compartment of the vehicle, an air cleaner 24 is disposed. An intake-duct 25 projects forward from the front face of the air cleaner. Two tube type resonators, one shorter size and the other longer, extend from the intake-duct in the longitudinal direction of the bumper reinforcement so as to be disposed completely therewithin. Each resonator is covered by an insulator made of urethane in order to prevent solid borne sounds from being transmitted to various parts within the engine compartment. The provision of different types of resonators reduces noise levels of different frequency bands. The long resonator 17 has extending portions 27, as flanges, integrally formed on its insulator at positions corresponding to those of the right-side bumper stay 5, the first bracket 19, and the second bracket 22, while on the insulator of the short resonator 18, extending portions 27 are integrally formed at two positions corresponding to those of the first and second brackets 19 and 22. The resonators 18 and 19 are attached to the bumper stay 5 and the first and second brackets 19 and 22 by bolts through the extending portions 27.

Referring to FIGS. 4 to 7, the process of installation of the resonators 17 and 18 and the bumper reinforcement will be described hereinbelow in due order. Points clarified by the above explanation will be omitted.

Figure 4:
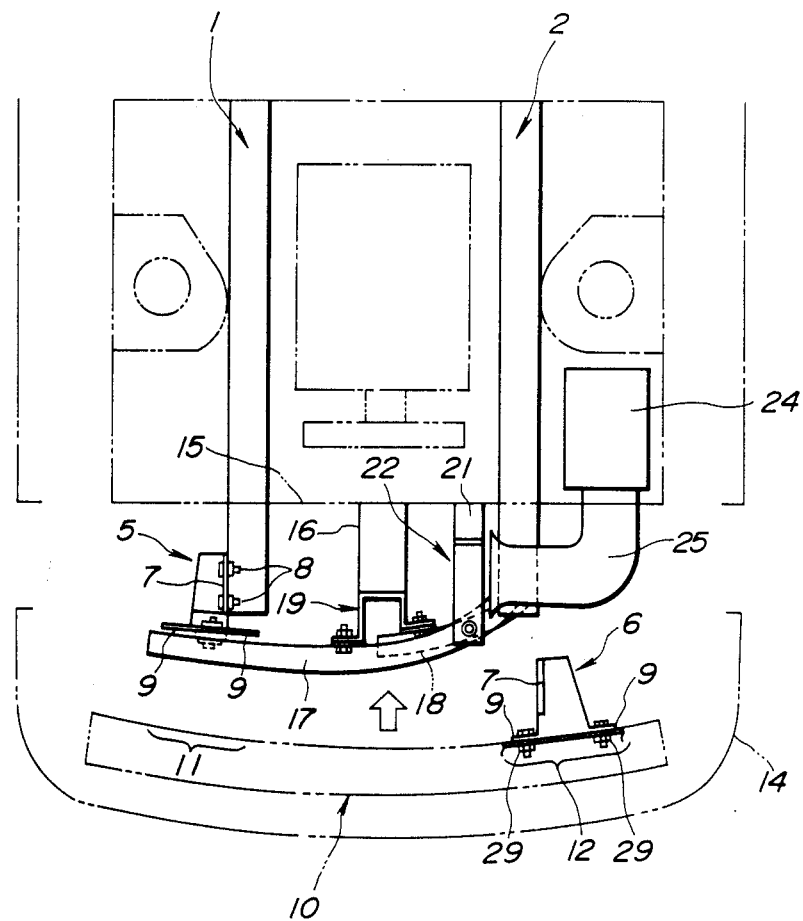
FIG. 4 is a schematic plane view which shows the arrangement after installation of a resonator, before installation of bumper reinforcement.

PROCESS FOR INSTALLATION OF RESONATOR (see FIG. 4)

First, right-side bumper stay 5 is installed on the right-side front member 1. Then, the three extending portions 27, integrally formed on the long resonator 17 which laterally extends from the intake duct 25, are fastened to a lower flange 5a (see FIG. 1) of the bumper stay 5, the right-side plate of the pair of mounting plates 20 of the first brackets 19, and the upper plate of the bifurcated mounting plates 23 of the second bracket 22 respectively by bolts. Additionally, the two extending portions 27 integrally formed on the short resonator 18 are fastened to the left-side plate of the pair of mounting plates 20 of the first bracket 19, and the lower plate of the bifurcated mounting plates 23 of the second bracket 22 respectively to finish the installation of the resonators themselves. It will be noted that in the described installation, the bumper reinformcement 10 is not yet disposed and therefore the portions on which resonators are installed (e.i., the bumper stay 5, the first bracket 19, and the second bracket 22) are exposed to allow easy mounting of the resonators.

Figure 5:
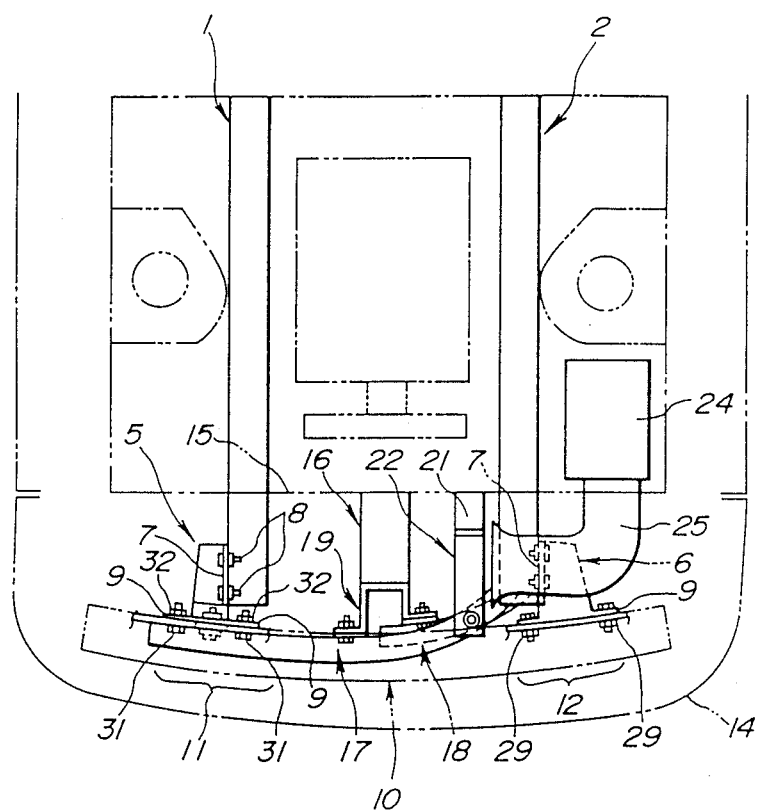
FIG. 5 is a schematic plane view which shows the arrangement after installation of bumper reinforcement.
Figure 6:
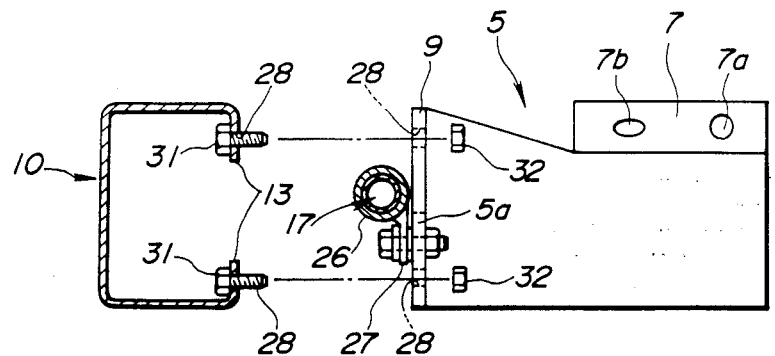
FIG. 6 is a cross sectional view which shows the connection between a right-side bumper stay and bumper reinforcement.
Figure 7:
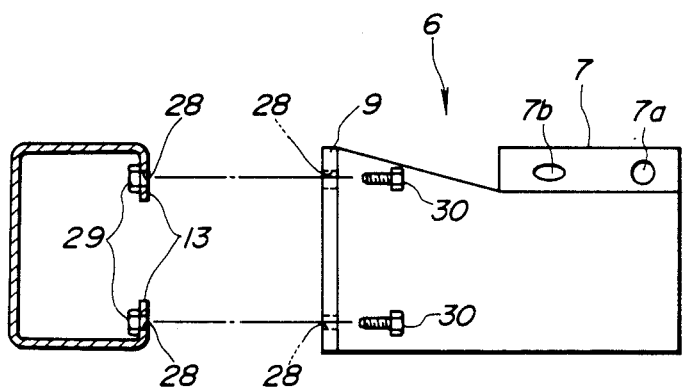
FIG. 7 is a cross sectional view which shows the connection between a left-side bumper stay and bumper reinforcement.

PROCESS FOR INSTALLATION OF BUMPER REINFORCEMENT (see FIGS. 5 to 7)

First, the left-side bumper stay 6 is mounted on the left-side mounting portion 12 of the bumper reinforcement 10 in such a manner that bolts 30 are screwed into the weld nuts through boltholes provided in the bumper stay (see FIG. 7). These nuts 29 have been previously welded on the inner surfaces corresponding to the boltholes 28 formed in the flanges 13 of the bumper reinforcement 10. Subsequently, this mounted bumper stay 6 is further installed on left-side front member 2 as an assembly in such a manner that bolts 8 are screwed into reference boltholes (not shown) provided in the closing plate 4 of the front member 2 through the boltholes 7a and 7b formed in the flange 7 of the bumper stay 6. Further, the right-mounting portion 11 of the bumper reinforcement 10 is secured to the right-side bumper stay 5 already installed on the front closing plate 3 in such a manner that the bumper stay 5 is attached to the bumper reinforcement 10 so that boltholes 28 formed in bumper stay 5 coincide with stud bolts 31 which are previously welded on inside surfaces so as to be aligned with boltholes 28 of the flange 13 of the bumper reinforcement 10 and then nuts 32 are rotated to fasten them. It will be noted that when the left-side bumper stay 6 is assembled on the front member 2, the stud bolts welded on the right-side mounting portion 11 of the bumper reinforcement 10 are inserted into the boltholes of the right-side bumper stay 5. The stud bolts 31 may be fastened by the nuts 32 from the bumper stay side to achieve easy assembly (see FIG. 6). When the bumper reinforcement 10 is mounted, the right-side section of the long resonator 17 installed on the bumper stay 5 is placed within the bumper reinforcement 10. The location of the long resonator 17 within the bumper reinforcement 17 is therefore attained simultaneously with the installation of the reinforcement 10. It will be appreciated that the installation of the bumper reinforcement 10 with respect to the front member may be effected regardless of position of the resonator 17.

As described above, the process for installation of resonators is carried out in such a manner that one of the bumper stays is mounted to one of front members provided on either side of the vehicle, the tube-type resonators which extend from the intake duct are installed to that bumper stay and the radiator core supporting panel. Thus the installation of the resonators can be done before the installation of the bumper reinforcement. This results in greatly simplified assembly operations and assembly accuracy.

Additionally, the other bumper stay which is preinstalled on one of the mounting portions of the bumper reinforcement is mounted on the other front member and then the other mounting portion of the bumper reinforcement is installed on the bumper stay mounted on the other front member. Thus, the resonator installed in place is disposed within the bumper reinforcement. As a result, sacrifice of assembly accuracy is unnecessary, an operator need pay attention only to the installation of the bumper reinforcement regardless of assembly of the resonators. This greatly improves asembly operations within the narrow confines of the engine compartment.

What is claimed is:

1. A process for installing a resonator, connected to an air intake system within an engine compartment of a vehicle, for reducing intake air noise levels, comprising the steps of:

mounting a first mounting member on a side member of a vehicle frame;

ataching the resonator to said first mounting member to form a first pre-assembly;

installing a second mounting member on a bumper to form a second pre-assembly; and securing said second mounting member to the other side member and said first mounting member to said bumper to mount said second pre-assembly to said first pre-assembly so as to dispose the resonator within said bumper.

2. A process as set forth in claim 1, wherein the resonator is a tube type covered by an insulator made of urethane to prevent solid borne sound from being transmitted to various parts provided within the engine compartment.

3. A process as set forth in claim 1, wherein said first and second mounting members are bumper stays for supporting a bumper of the vehicle.

4. A process as set forth in claim 1, wherein said bumper includes a first mounting portion and a second mounting portion, said first mounting portion having a weld bolt, said second mounted portion having a weld nut, said installing step including a step of incorporating said second mounting member with said bumper by tightening a bolt into said weld bolt, said securing step including a step of incorporating said bumper with said first mounting member by fastening a nut to said wild bolt.

5. A process for installing a resonator including a first tube and a second tube shorter than the first tube, connected to an intake air duct within an engine compartment of a vehicle, for reducing air intake noise levels, comprising the steps of:

mounting a first bumper stay on a front portion of one side member of a pair of side members of a vehicle frame;

attaching the first tube to said first bumper stay and the second tube to a supporting member provided on a radiator supporting member within an enging compartment;

mounting a second bumper stay already installed on a bumper reinforcement member to a front portion of the other side member so as to dispose said first and second tubes within said bumper reinforcement member; and installing said bumper reinforcement to said first bumper stay to be secured with respect to said side members.

6. A process as set forth in claim 5, wherein said attaching step comprises securing said first and second tubes to a second supporting member provided on the radiator supporting member.

7. A process as set forth in claim 5, wherein the first and the second tubes are covered by insulators made of urethane to prevent solid borne sound from being transmitted to various parts provided within the engine compartment.

8. A process as set forth in claim 5, wherein said bumper reinforcement includes a first mounting portion and a second mounting portion, said first bumper stay having a weld bolt, said second bumper stay having a weld nut, said step of mounting said bumper stay to the other side member further including a step of incorporating said second bumper stay with said bumper reinforcement by tighteining a bolt into said weld bolt, said installing step further including a step of incorporating said bumper reinforcement with said first bumper stay by fastening a nut to said weld bolt.

* * * * *

UNITED STATES PATENT AND TRADEMARK OFFICE
CERTIFICATE OF CORRECTION

PATENT NO. : 4,984,350

DATED : January 15, 1991

INVENTOR(S) : Toshihiko Hayashi

It is certified that error appears in the above-identified patent and that said Letters Patent is hereby corrected as shown below:

Column 6, line 12, change "wild" to --weld--;
         line 24, change "enging" to --engine--;
         line 50, change "tighteining" to --tightening--.

Signed and Sealed this

Eleventh Day of August, 1992

*Attest:*

DOUGLAS B. COMER

*Attesting Officer*      *Acting Commissioner of Patents and Trademarks*